Feb. 20, 1968        H. G. STEINHAGEN        3,369,639
FLUID ACTUATED CLUTCH WITH MODULATED EXHAUST VALVE
Filed June 6, 1966
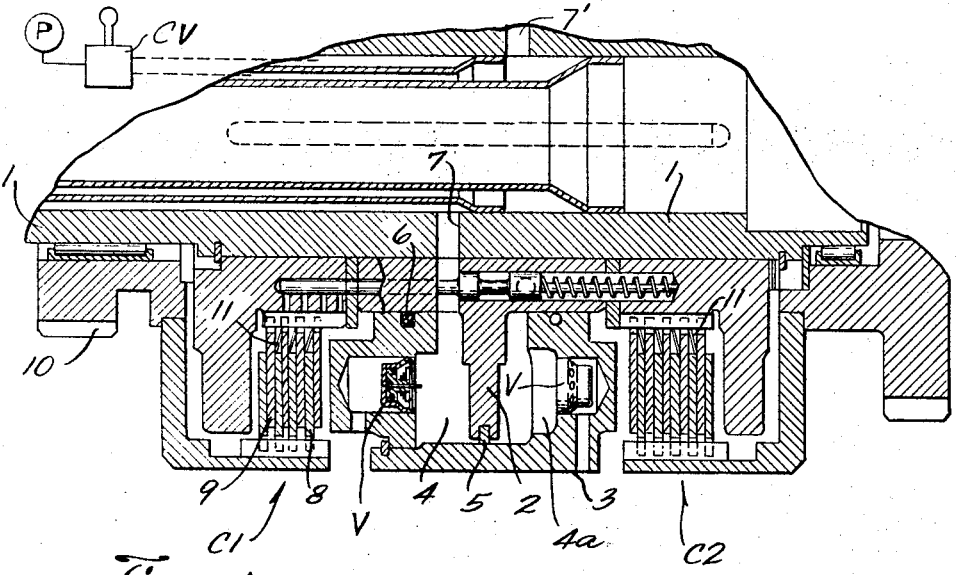
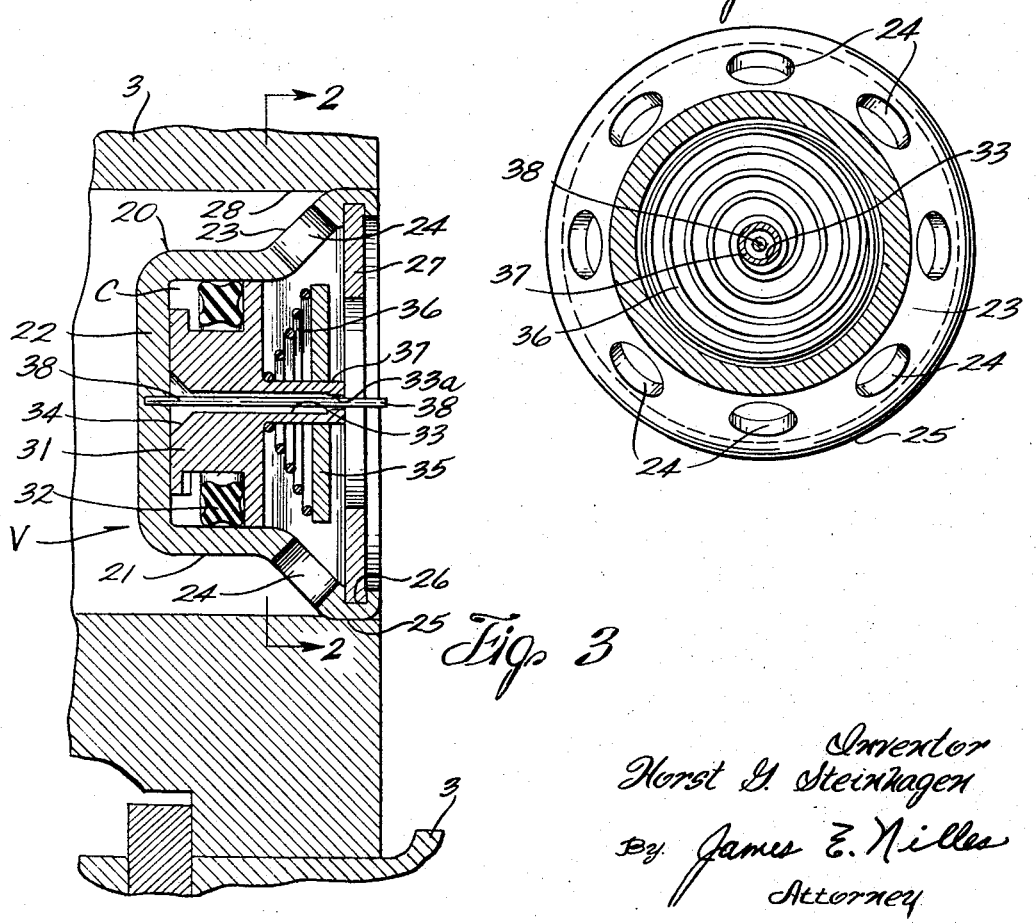
Inventor
Horst G. Steinhagen
By James E. Nilles
Attorney

United States Patent Office 3,369,639
Patented Feb. 20, 1968

3,369,639
FLUID ACTUATED CLUTCH WITH MODULATED EXHAUST VALVE
Horst G. Steinhagen, Racine, Wis., assignor to Twin Disc Clutch Company, Racine, Wis., a corporation of Wisconsin
Filed June 6, 1966, Ser. No. 555,336
9 Claims. (Cl. 192—87.17)

This invention relates generally to hydraulically actuated clutches and more specifically to such a clutch having an improved cushioning valve.

Prior art devices, such as Patent No. 3,042,165 issued July 3, 1962 to E. C. Yokel have proposed to use a valve somewhere in the control system for reducing shock. Other prior art devices such as U.S. Patent No. 3,243,026 issued Mar. 29, 1966 to Snoy et al., Patent No. 3,245,507 issued Apr. 12, 1966 to Hilpert or Patent No. 3,262,531 issued July 26, 1966 to Black et al. have used secondary, cushioning pistons which engage the clutch pack first and then the main piston subsequently applies the final clamp up force. However, these prior devices have not always proved to be entirely satisfactory because of their cost or complexity.

An object of the present invention is to provide a hydraulically actuated clutch having an improved cushioning valve for insuring smooth engaging characteristics of the clutch, the valve being simple, foolproof in operation, economical to produce, and installed directly in the clutch housing. The valve assembly itself is a complete unit which can be installed on existing designs.

These and other objects and advantages will appear hereinafter as this disclosure progresses, reference being had to the accompanying drawings, in which:

FIGURE 1 is a longitudinal, fragmentary, cross sectional view through a clutch embodying the present invention;

FIGURE 2 is a transverse sectional view taken along line 2—2 in FIGURE 3, and

FIGURE 3 is a fragmentary, enlarged view of a portion of FIGURE 1, showing the valve plate moved to the open position.

The invention has been shown as applied to dual, opposed type clutches C1 and C2 and as these clutches are similar, only one will be described.

Referring in greater detail to the drawings, a power input shaft 1 has an axially fixed reaction member 2 fixed thereon and together with an annular housing 3 forms expansible fluid chambers 4 and 4a. Suitable seals 5 and 6 are provided to prevent leakage of the pressure fluid which is introduced via passages 7 and 7' to chambers 4 and 4a respectively, from a control valve CV, from fluid source P.

Expansion of chamber 4 causes the housing 3 to shift axially, causing clamp-up of the interleaved clutch plates 8 and 9 fixed, respectively, on the input and output members 1 and 10. Thus the reaction member 2 and piston 3 form relatively shiftable members which form an expansible fluid chamber 4 that, when pressurized, causes clamp up of the interleaved friction plates 8 and 9.

Clutch release, Belleville springs 11 are also provided and these, together with the various fluid seals, create a certain drag which the pressure fluid must first overcome before actuation of the clutch, that is, plate clamp-up, occurs.

According to the present invention, an improved and simple valve V is mounted directly on the housing and acts to cushion the clutch and smooth out its engaging characteristics by regulating the pressure in the chamber. This valve is particularly compact and acts as a pressure modulating device, as will appear.

The improved valve includes a cup-shaped element 20 having a cylindrical portion 21, integral back wall 22, outwardly extending flange portion 23 having a series of holes 24 therethrough, and an outer edge 25 which has an internal groove 26 formed therearound. A flat ring-plate 27 is fixed in groove 26 and forms a valve seat.

The cup element 20 is securely fixed directly in the housing 3, by any suitable means such as being press fit in an opening 28 in housing 3. Once assembled, it need not be replaced or adjusted and functions automatically without attention.

The valve also includes a piston 31 slidable in cylinder portion 21 and a ring seal 32 forms a sliding seal fit therebetween. An axial passage 33 is formed centrally through the piston and terminates at its rear end in a chamfer 34. When the chamber 4 is initially pressurized, the chamber 34 permits initial entry of fluid through the passage 33 and into the small chamber C behind the piston to cause the latter to shift to the right (as viewed in the drawings).

The piston also includes an integrally formed, central stem 37 on which is slidably a valve element in the form of plate 35. A spring 36 resiliently urges the plate 35 against the ring-plate 27 to form a valve therewith.

A pin 38 is fixed at its rear end to the cup member 20 and extends freely through passage 33 and functions primarily to keep the passage free of foreign matter, particularly at the orifice 33a of passage 33 which is formed by the clearance between the stem 34 and the pin 38. The size of orifice 33a determines the speed of valve actuation.

OPERATION

The strength of spring 36 is chosen to overcome the initial drag of the piston rings and release spring. As fluid pressure is admitted to chamber 4, the annular piston 3 shifts to the left (as viewed in FIGURE 1), to abut against the clutch plate pack. As pressure continues to build up in chamber 4, the valve plate 35 opens, (see FIGURE 3) permitting pressure fluid to flow at a regulated rate out of chamber 4 via openings 24.

Pressure fluid also enters via passage 33 and behind the piston 31, that is between piston 31 and the rear end of cylinder portion 21. This causes the piston 31 to shift to the right, carrying with it the spring 36, thus eventually forcing the valve plate 35 against the ring plate 27, closing the valve.

Pressure fluid in chamber 4 then causes the annular piston 3 to clamp up the plates, fully engaging the clutch. This gradual or controlled rate of the clutch actuating piston movement results in full clutch engagement in a smooth or cushioned manner.

To release the clutch, the pressure in chamber 4 is reduced and Belleville springs 11 push the piston 3 back to neutral. The spring 36 then pushes the small piston 31 back, that is, to the right or retracted position setting it for the next engagement.

Various numbers of these valves may be used for each clutch, and one has proved to be sufficient for many applications. Springs of various rates may be used to vary the rate of pressure rise and also the point of commencement of this rise.

RESUME

By putting a controlled rate of rise valve directly in the clutch, in accordance with the present invention, this valve will modulate the clutch engaging pressure from the desired starting pressure to the desired final pressure evenly, at the desired rate. This valve will accurately control the piston regardless of any line loss or delay of pressure from the control valve CV.

Various modes of carrying out the invention are contemplated as being within the scope of the following claims particularly pointing out and distinctly claiming the subject matter which is regarded as the invention:

1. A hydraulically actuated clutch having interleaved friction plates and also having two relatively shiftable members which together form a clutch actuating and expansible fluid chamber for causing clamp up of said plates, a pressure modulating valve mounted directly on one of said members and adapted to place said chamber in communication with the atmosphere to cause dumping of fluid directly from said chamber, said valve including a cup-shaped element fixed directly to one of said members and having a cylindrical portion and a valve seat, a small piston sealingly slidable in said cylindrical portion and forming a small fluid chamber therewith, said piston having a stem extending therefrom and towards said valve seat, a shiftable valve element within said cup-shaped element and on said stem and resiliently and yieldingly held against said seat in a valve closed position, and passage means between said clutch actuating chamber and said small fluid chamber, whereby pressure fluid in said clutch actuating chamber will initially cause shifting of said valve element away from said seat and to an open position to thereby dump fluid from said actuating chamber, and continued pressurization of said clutch actuating chamber will cause said small piston to be moved by fluid pressure in said small chamber to urge said valve element to a closed position against its seat.

2. The clutch as defined in claim 1 further characterized in that said valve is an integral and self-contained assembly, and said cup-shaped element is rigidly fixed in an opening in one of said members.

3. The clutch as defined in claim 2 further characterized in that said cup-shaped element also has an outwardly extending flange portion from said cylindrical portion, said flange portion having holes therethrough for dumpng fluid.

4. The clutch as set forth in claim 1 further characterized in that said valve seat is a flat ring-plate secured to said cup-shaped element, and said valve element is a plate slidable on said stem.

5. The clutch as defined in claim 1 further characterized in that said passage means extends axially through said stem.

6. The clutch as set forth in claim 2 further characterized in that said valve seat is a flat ring-plate secured to said cup-shaped element, and said valve element is a plate slidable on said stem.

7. The clutch as defined in claim 2 further characterized in that said passage means extends axially through said stem.

8. The clutch as set forth in claim 3 further characterized in that said valve seat is a flat ring-plate secured to said cup-shaped element, and said valve element is a plate slidable on said stem.

9. The clutch as defined in claim 3 further characterized in that said passage means extends axially through said stem.

References Cited
UNITED STATES PATENTS

| | | | |
|---|---|---|---|
| 2,386,220 | 10/1945 | Lawler et al. | 192—85 |
| 2,702,618 | 2/1955 | Baker et al. | 192—85 |
| 2,935,999 | 5/1960 | Hock et al. | 192—109 |
| 3,215,236 | 11/1965 | Pensa | 192—109 |

BENJAMIN W. WYCHE III, *Primary Examiner.*